US010819181B2

United States Patent
Hochstetler et al.

(10) Patent No.: US 10,819,181 B2
(45) Date of Patent: Oct. 27, 2020

(54) TERMINAL LEAD SUPPORT FOR USE IN INTEGRATED DRIVE GENERATOR

(71) Applicant: HAMILTON SUNDSTRAND CORPORATION, Charlotte, NC (US)

(72) Inventors: Derek R. Hochstetler, Rockford, IL (US); Ted A. Martin, Byron, IL (US); Duane C. Johnson, Beloit, WI (US); Glenn C. Lemmers, Jr., Loves Park, IL (US)

(73) Assignee: Hamilton Sundstrand Corporation, Charlotte, NC (US)

( * ) Notice: Subject to any disclaimer, the term of this patent is extended or adjusted under 35 U.S.C. 154(b) by 481 days.

(21) Appl. No.: 15/872,333

(22) Filed: Jan. 16, 2018

(65) Prior Publication Data

US 2019/0222092 A1 Jul. 18, 2019

(51) Int. Cl.
| | | |
|---|---|---|
| F02C 7/32 | (2006.01) | |
| H02K 5/22 | (2006.01) | |
| H02K 15/00 | (2006.01) | |
| H01R 9/24 | (2006.01) | |
| H01R 107/00 | (2006.01) | |
| H01R 9/22 | (2006.01) | |

(52) U.S. Cl.
CPC ............ H02K 5/225 (2013.01); F02C 7/32 (2013.01); H01R 9/24 (2013.01); H02K 15/0006 (2013.01); F05D 2220/764 (2013.01); F05D 2260/30 (2013.01); H01R 9/223 (2013.01); H01R 2107/00 (2013.01); H01R 2201/10 (2013.01); H01R 2201/26 (2013.01)

(58) Field of Classification Search
CPC ...... H02K 5/225; H02K 15/0006; F02C 7/32; H01R 9/24
USPC .......................................................... 310/71
See application file for complete search history.

(56) References Cited

U.S. PATENT DOCUMENTS

| | | |
|---|---|---|
| 9,105,990 B2 | 8/2015 | Akuta |
| 2003/0042808 A1 | 3/2003 | Keidar et al. |
| 2012/0223601 A1* | 9/2012 | Akuta ............... H02K 9/19 310/58 |
| 2014/0305692 A1 | 10/2014 | Hochstetler et al. |

OTHER PUBLICATIONS

European Search Report for EP Application No. 19151160.9 dated Jun. 7, 2019.

* cited by examiner

*Primary Examiner* — Terrance L Kenerly
(74) *Attorney, Agent, or Firm* — Carlson, Gaskey & Olds, P.C.

(57) ABSTRACT

A terminal lead support for use in an integrated drive generator has a body defining an outer end extending to two outer angled surfaces. The outer angled surfaces each extend to curved end portions. The curved end portions connect the outer angled surfaces into inner angled surfaces. The inner angled surfaces each extend into cupped portions formed about a radius. There are six apertures formed within the body, with laterally outer apertures spaced from the outer surface by a greater amount than laterally intermediate apertures. The laterally intermediate apertures are spaced from the outer surface by a greater amount than laterally inner apertures. An integrated drive generator and a method of replacing a terminal lead support are also disclosed.

8 Claims, 4 Drawing Sheets

US 10,819,181 B2

TERMINAL LEAD SUPPORT FOR USE IN INTEGRATED DRIVE GENERATOR

BACKGROUND

This application relates to a terminal lead support for terminal leads of an integrated drive generator.

Integrated drive generators are known and often utilized in aircraft. As known, a gas turbine engine on the aircraft provides a drive input into a generator input shaft. The generator typically includes a disconnect shaft that can transmit the input into a gear differential. The gear differential selectively drives a main generator to provide electric power for various uses on the aircraft.

It is desirable that the generated power be of a desired constant frequency. However, the speed from the input shaft will vary during operation of the gas turbine engine. This would result in variable frequency.

Integrated drive generators are provided with speed trimming hydraulic units. Gears associated with the differential and, in particular, a ring gear portion, provide rotation from the differential back into the trimming unit. A carrier also rotates another portion of the trimming unit. The trimming unit is operable to result in the output speed of the differential being effectively constant, such that electric power of a desirable frequency is generated.

The generator is mounted between two housing portions and a seal plate is mounted between the two housing portions.

In addition, various accessory systems, such as various pumps, are driven by the carrier of the differential through an accessory drive gear.

A terminal lead support for supporting terminal leads leaving the integrated drive generator faces design challenges.

SUMMARY

A terminal lead support for use in an integrated drive generator has a body defining an outer surface extending to two outer angled surfaces. The outer angled surfaces each extend to curved end portions. The curved end portions connect the outer angled surfaces into inner angled surfaces. The inner angled surfaces each extend into cupped portions formed about a radius. There are six apertures formed within the body, with laterally outer apertures spaced from the outer surface by a greater amount than laterally intermediate apertures. The laterally intermediate apertures are spaced from the outer surface by a greater amount than laterally inner apertures.

An integrated drive generator and a method are also disclosed.

These and other features may be best understood from the following drawings and specification.

DETAILED DESCRIPTION

Figure 1A:
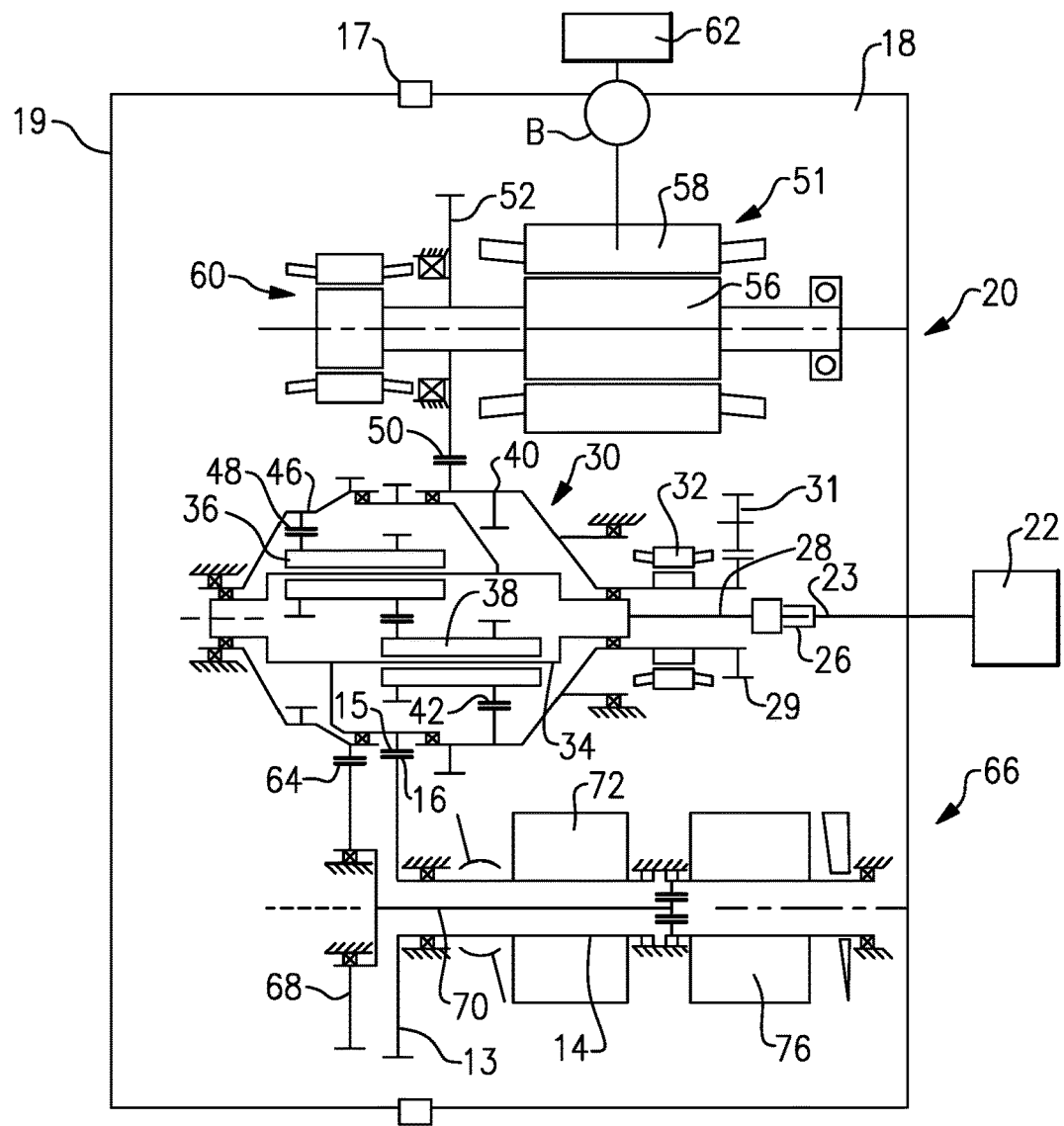
FIG. 1A schematically shows an integrated drive generator.

FIG. 1A shows an integrated drive generator 20. As shown, housing portions 18 and 19 surround the integrated drive generator and a seal plate 17 sits between the housing portions 18 and 19.

A gas turbine engine 22 may drive an input shaft 23 which selectively drives a disconnect assembly 26. The disconnect assembly 26, in turn, drives a carrier shaft 28, which drives a carrier in a gear differential 30.

As the carrier shaft 28 rotates, planet gears 36 and 38 are caused to rotate. Gears 38 have a gear interface 42 with a first ring gear portion 40. Gears 36 have a gear interface 48 with a second ring gear portion 46.

Ring gear portion 40 has a gear interface 50 with a main generator 51 having a drive gear 52. When drive gear 52 is driven to rotate, it rotates a rotor 56 associated with a stator 58 of the main generator as well as an exciter rotor 60. Electric power is generated for a use 62, as known.

It is desirable that the frequency of the generated electric power be at a desired frequency. This requires the input speed to gear 52 to be relatively constant and at the desired speed. As such, the speed of the input shaft 23 is added to the speed of the speed trimmer 66 to result in a constant input speed to gear 52.

A gear 15 that is part of the carrier has a gear interface 16 with a gear 13 driving a shaft 14 also within the speed trimmer.

As known, the speed trimmer 66 includes a variable unit 72 and a fixed unit 76. The units 72 and 76 may each be provided with a plurality of pistons and a swash plate arrangement. If the input speed of the gear 13 is too high, the speed of the gear 52 will also be too high, and hence, the speed trimmer 66 acts to lower the speed of the trim gear 46 which will drop the speed of gear 52. On the other hand, if the input speed is too low, the speed trimmer will increase the trim gear speed and the speed seen by gear 52 will increase.

In essence, the variable unit 72 receives an input through gear 13 that is proportional to the speed of the input shaft 23. The variable unit 72 also receives a control input from a control monitoring the speed of the generator rotor 56. The position of the swash plate in the variable unit 72 is changed to in turn change the speed and direction of the fixed unit 76. The fixed unit 76 can change the speed, and direction of rotation of the shaft 70, and this then provides control back through the trim ring gear 46 to change the speed reaching the generator. In this manner, the speed trimmer 66 results in the frequency generated by the generator being closer to constant, and at the desired frequency.

A permanent magnet generator 32 rotates with the ring gear 40.

An accessory drive shaft 29 rotates with the carrier shaft 28 and drives a plurality of accessory gears 31.

The operation of the integrated drive generator 20 is generally as known in the art. A worker of ordinary skill would recognize that the desired frequency and speed at use 62 would dictate a number of design functions.

As can be appreciated, the power leaving the integrated drive generator 20 to the uses 62 must pass through a terminal at the area schematically shown at B.

Figure 1B:
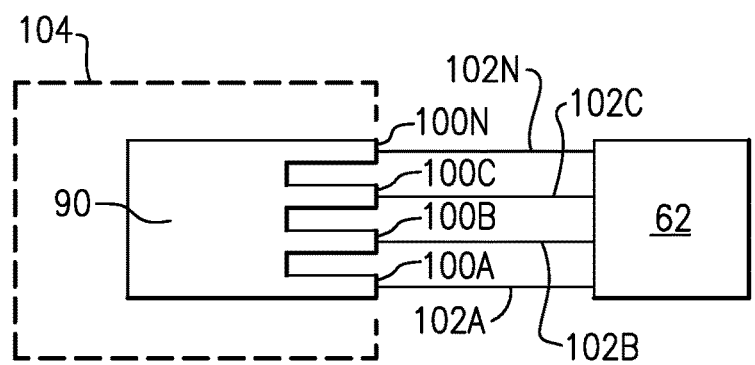
FIG. 1B shows a detail of the area B from FIG. 1A.

FIG. 1B schematically shows detail of the area B. As shown, an output terminal 90 has a plurality of discrete connections shown schematically here. Three phases of power are supplied from electrical connections 100A, 100B, and 100C. A neutral 100N is also included. A plurality of wires 102N, A, B and C connect to the uses 62. Thus, power is supplied to uses 62. A terminal block cover 104 is identified by a body 105 (FIGS. 2A-2E) and covers the connections 100A, 100B, 100C and 100N.

Figure 2A:
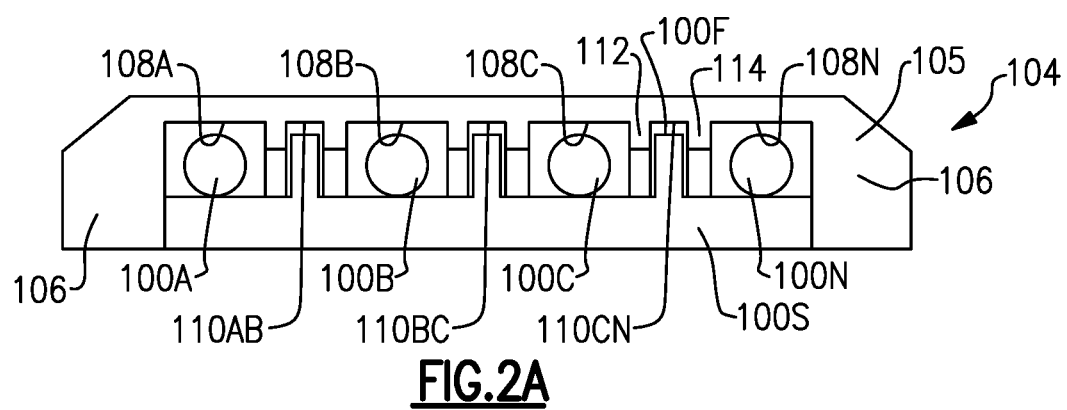
FIG. 2A shows a first detail of the FIG. 1B connection.

FIG. 2A shows the terminal block cover 104 having opposed thick ends 106 and intermediate connection channels 108A, 108B, 108C, and 108N for receiving the connections 100A, 100B, 100C, and 100N, respectively. Intermediate spacing channels 110AB, 110BC, and 110CN separate each of the connections to provide increased creep and lightning protection.

A support, or terminal block 100, supports the connections 100A, B, C and N. Terminal block 100 has a support surface 100S with fingers 100F that extend into the spacing channels 110AB, 110BC, and 110CN.

Figure 2B:
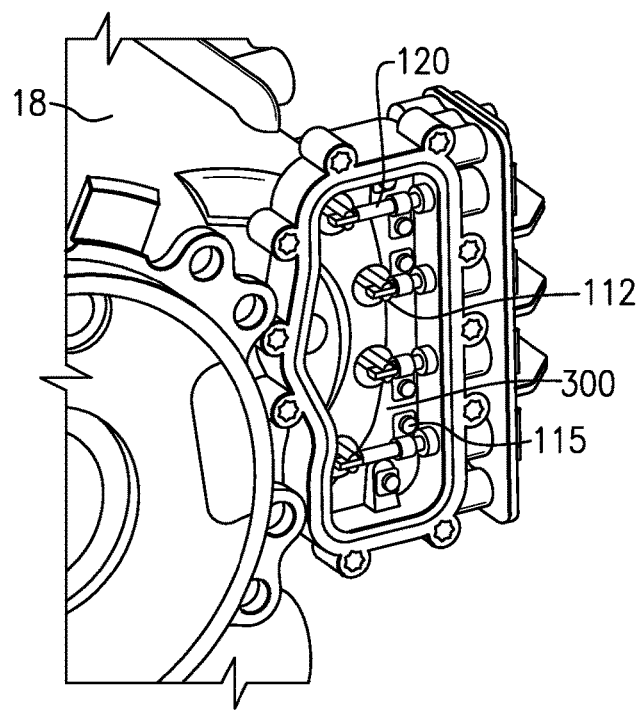
FIG. 2B shows further details.

FIG. 2B is an assembly view showing the housing 18 with terminal block 100 and the terminal block cover 104 removed. Terminal lead assemblies 120 extend through holes in the terminal block, as will be explained below, and through holes 111 in the housing 18 to communicate with electrical connections 112A, 112B, 112C, and 112N, which extend from the generator (ref FIG. 2C).

Figure 2C:
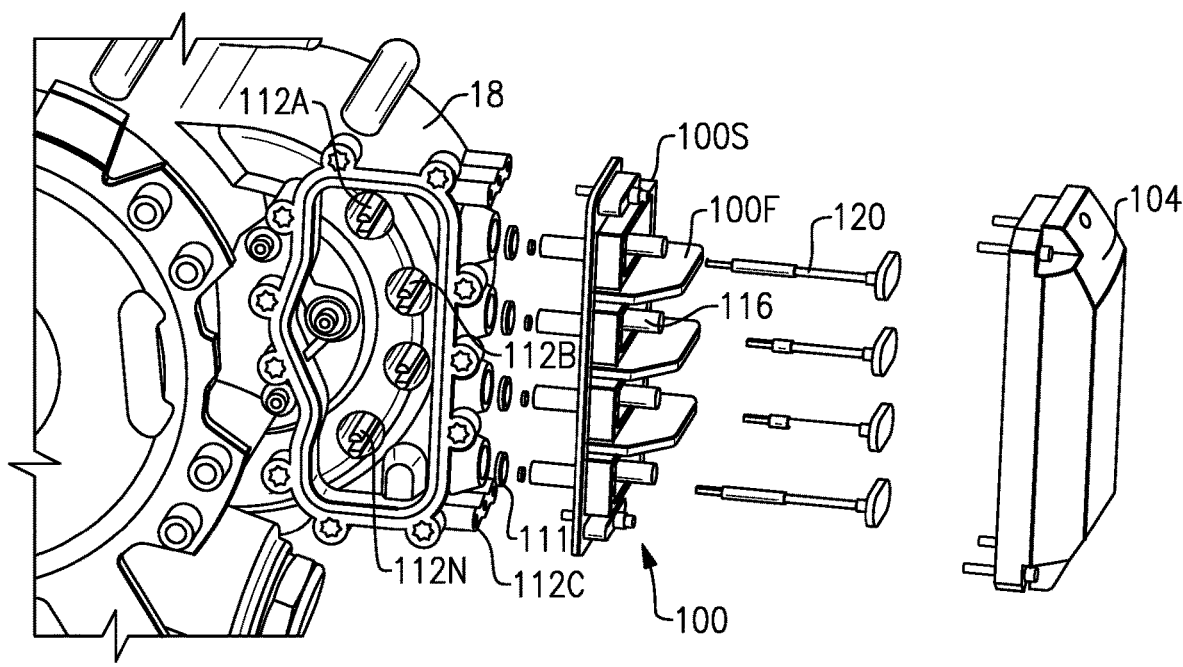
FIG. 2C shows further details.

FIG. 2C is an assembly view showing an inner end of the terminal lead assemblies 120 connected into the leads 112. A terminal lead support 300 (see FIG. 2B) is also shown which includes clamps 115 to secure intermediate portions of the terminal lead assembly 120 to the housing 18.

Figure 3A:
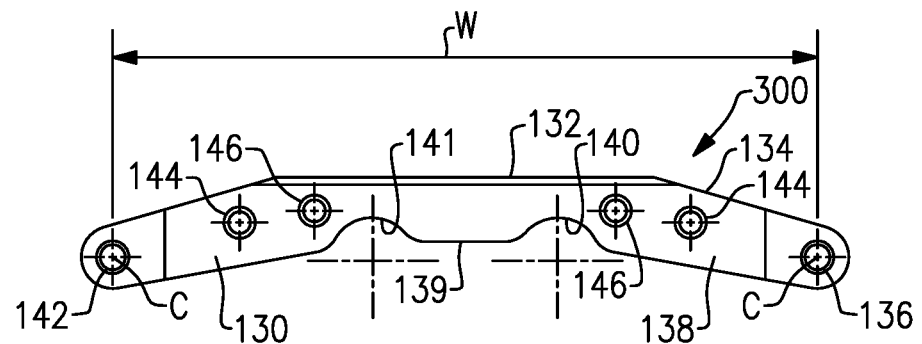
FIG. 3A shows a terminal lead support.

A terminal lead support 300, as is shown in FIG. 2B, is illustrated in FIG. 3A. The terminal lead support 300 is defined by a body 130 having a complex outer shape. In particular, a flat outer surface 132 extends to outer angled surfaces 134 extending in a first direction away from said outer surface and to curved ends 136. Curved ends lead into inner angled surfaces 138, which extend to two cupped portions 140 and 141 separated by a flat surface 139. The body 130 includes apertures 142 adjacent to each of the curved ends 136 and interior apertures 144 and 146. As can be understood from FIG. 2C, the apertures 142, each receive screws to secure the terminal lead support 300 to the housing and apertures 144 and 146 receive screws to further secure the terminal lead assemblies to the terminal lead support 300. A width W may be defined between centers C of the apertures 142. There are six apertures formed within the body, with laterally outer apertures 142 spaced from the outer surface by a greater amount than laterally intermediate apertures 144. The laterally intermediate apertures 144 are spaced from the outer surface by a greater amount than laterally inner apertures 146.

Figure 3B:
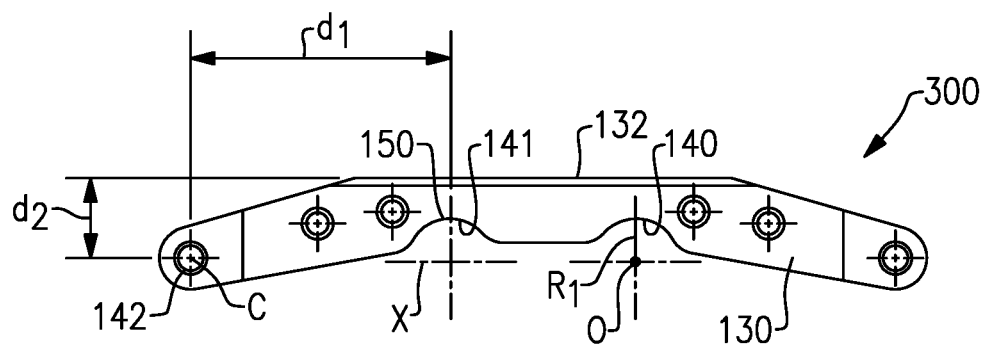
FIG. 3B shows further details.

FIG. 3B shows further details. A first distance $d_1$ is defined between the center point C of the apertures 142 and an adjacent cupped portion 141 and, in particular, its midpoint 150. The distance is measured along line X, which bisects apertures 142. Further, as shown in FIG. 3B, the cupped portions 141 and 140 are formed about a radius of curvature $R_1$ away from an origin O. A width W is defined between centerpoints C of the laterally outermost apertures 142. The width W is also measured along the line X. A second distance $d_2$ is defined extending perpendicular to line X from a centerpoint C to an extension of the outer surface 132.

In embodiments, W was 5.671 inches (14.404 centimeters), $d_1$ was 2.087 inches (5.300 centimeters), and $d_2$ was 0.6400 inches (1.626 centimeters). $R_1$ was 0.344 inch (0.874 centimeters). In embodiments, a ratio of W to $d_1$ was between 2.5 and 3.0. A ratio of W to $d_2$ was between 7 and 10. A ratio of W to $R_1$ was between 15 and 18.

A method of replacing a terminal lead support includes the steps of removing an existing terminal lead support from an integrated drive generator including an input shaft for providing a drive input to a carrier shaft. The carrier shaft is connected input into a gear differential and to a main generator. The main generator includes a power outlet for providing electrical power to terminal leads, and the existing terminal lead support supporting a terminal lead. The existing terminal lead support is then replaced with a replacement terminal lead support, including a body defining an outer surface extending to two outer angled surfaces. The outer angled surfaces each extend to curved end portions, which connect the outer angled surfaces into inner angled surfaces. The inner angled surfaces each extend into a cupped portion formed about a radius. There are six apertures formed within the body with laterally outer apertures spaced from the outer surface by a greater amount than laterally intermediate apertures. The laterally intermediate apertures are spaced from the outer surface by a greater amount than laterally inner apertures.

Although an embodiment of this invention has been disclosed, a worker of ordinary skill in this art would recognize that certain modifications would come within the scope of this disclosure. For that reason, the following claims should be studied to determine the true scope and content of this disclosure.

The invention claimed is:

1. A terminal lead support for use in an integrated drive generator comprising:
   a body defining an outer surface extending to two outer angled surfaces, said outer angled surfaces each extending to curved end portions, said curved end portions connecting said outer angled surfaces into inner angled surfaces, and said inner angled surfaces each extending into a cupped portion formed about a radius, and there being six apertures formed within said body, with laterally outer apertures spaced from said outer surface by a greater amount than laterally intermediate apertures, and said laterally intermediate apertures being spaced from said outer surface by a greater amount than laterally inner apertures;
   wherein center points of said laterally outermost apertures are spaced from a midpoint of an adjacent one of said cupped portions by a first distance, and said center point of said laterally outermost apertures are spaced from said outer surface by a second distance and a ratio of said first distance to said second distance being between 2.5 and 3.0;
   wherein said laterally outer apertures each having a center point, and said center point of said outer apertures being spaced by a width and a ratio of said width to said second distance being between 7 and 10.

2. The terminal lead support as set forth in claim 1, wherein said cupped portions are formed about a first radius of curvature away from an origin and a ratio of said width to said radius of curvature being between 15 and 18.

3. An integrated drive generator comprising:
   an input shaft connected to a carrier shaft, said carrier shaft connected to a gear differential, and into a main generator, said main generator including a power output configured for providing electrical power to terminal leads, and there being a terminal lead support supporting said terminal leads;
   said terminal lead support having a body defining an outer end extending to two angled surfaces, said outer angled surfaces each extending to curved end portions, said curved end portions connecting said outer angled surfaces into inner angled surfaces, and said inner angled surfaces each extending into a cupped portion formed about a radius, and there being six apertures formed within said body, with laterally outer apertures spaced from said outer surface by a greater amount than laterally intermediate apertures, and said laterally intermediate apertures being spaced from said outer surface by a greater amount than laterally inner apertures;

wherein center points of said laterally outermost apertures are spaced from a midpoint of an adjacent one of said cupped portions by a first distance, and said center point of said laterally outermost apertures are spaced from said outer surface by a second distance and a ratio of said first distance to said second distance being between 2.5 and 3.0;

wherein said laterally outer apertures each having a center point, and said central point of said outer apertures being spaced by a width and a ratio of said width to said second distance being between 7 and 10.

4. The terminal lead support as set forth in claim 3, wherein said cupped portions are formed about a first radius of curvature away from an origin and a ratio of said width to said radius of curvature being between 15 and 18.

5. The integrated drive generator as set forth in claim 3, wherein a width is defined between center points of said laterally outermost apertures, and wherein said cupped portions are formed about a first radius of curvature away from an origin and a ratio of said width to said radius of curvature being between 15 and 18.

6. The integrated drive generator as set forth in claim 3, wherein said terminal leads are secured to said terminal lead support with clamps.

7. A method of replacing a terminal lead support comprising the steps of:
a) removing an existing terminal lead support from an integrated drive generator including an input shaft connected to a carrier shaft, said carrier shaft connected to a gear differential, and to a main generator, said main generator configured for providing three phases of electrical power to three electrical connections connected to terminal leads, and said existing terminal lead support supporting said terminal leads;
b) replacing said existing terminal lead support with a replacement terminal lead support, said replacement terminal lead support including a body defining an outer surface extending to two outer angled surfaces, said outer angled surfaces each extending to curved end portions, said curved end portions connecting said outer angled surfaces into inner angled surfaces, and said inner angled surfaces each extending into a cupped portion formed about a radius, and there being six apertures formed within said body, with laterally outer apertures spaced from said outer surface by a greater amount than laterally intermediate apertures, and said laterally intermediate apertures being spaced from said outer surface by a greater amount than laterally inner apertures;

wherein center points of said laterally outermost apertures are spaced from a midpoint of an adjacent one of said cupped portions by a first distance, and said center point of said laterally outermost apertures are spaced from said outer surface by a second distance and a ratio of said first distance to said second distance being between 2.5 and 3.0;

wherein said laterally outer apertures each having a center point, and said central point of said outer apertures being spaced by a width and a ratio of said width to said second distance being between 7 and 10.

8. The terminal lead support as set forth in claim 7, wherein said cupped portions are formed about a first radius of curvature away from an origin and a ratio of said width to said radius of curvature being between 15 and 18.

* * * * *